April 29, 1958  R. R. CARLTON  2,832,180
METHOD OF SHARPENING SAW CHAIN TEETH
Filed Feb. 10, 1955  2 Sheets-Sheet 1
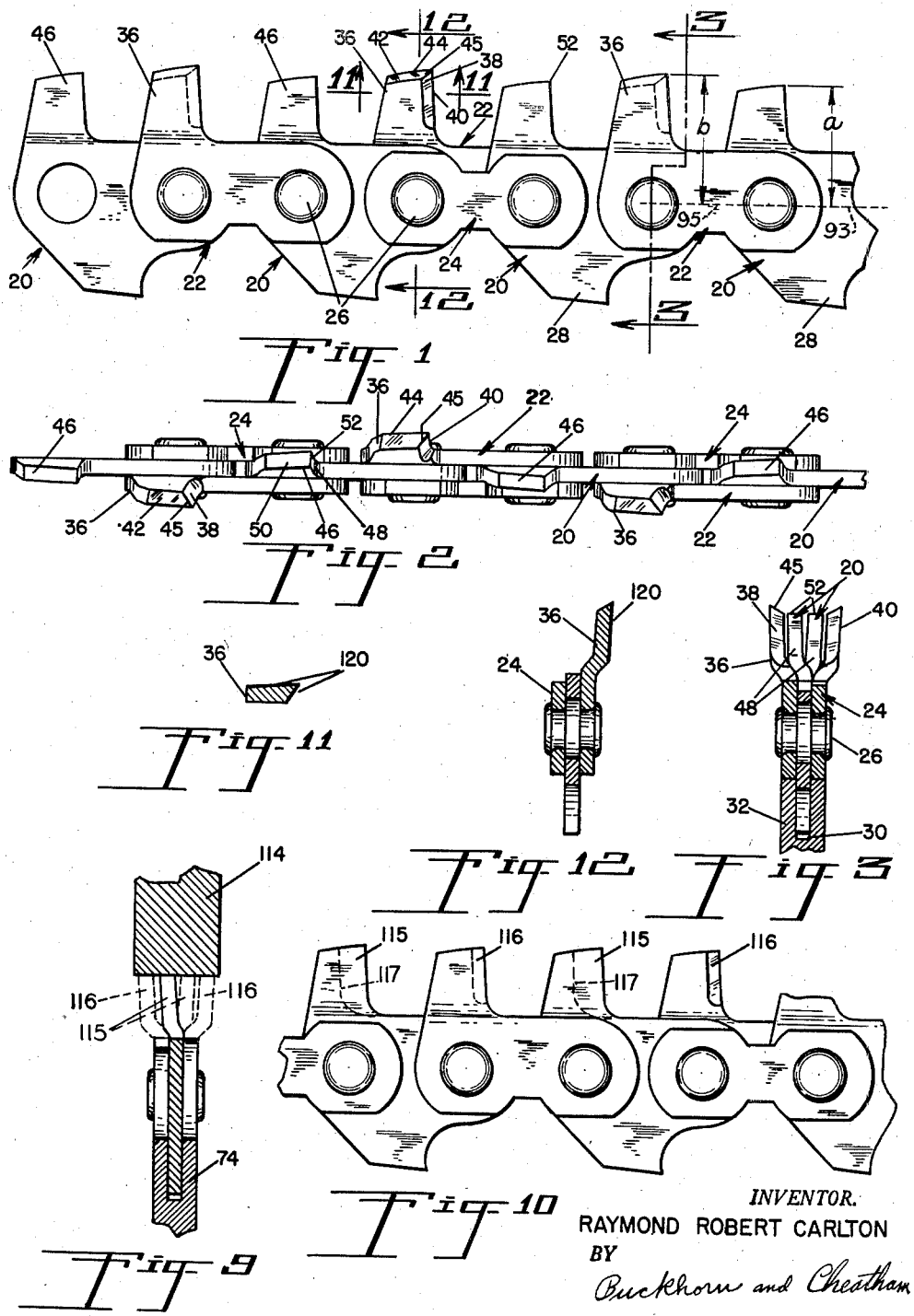
INVENTOR.
RAYMOND ROBERT CARLTON
BY
Buckhorn and Cheatham
ATTORNEY

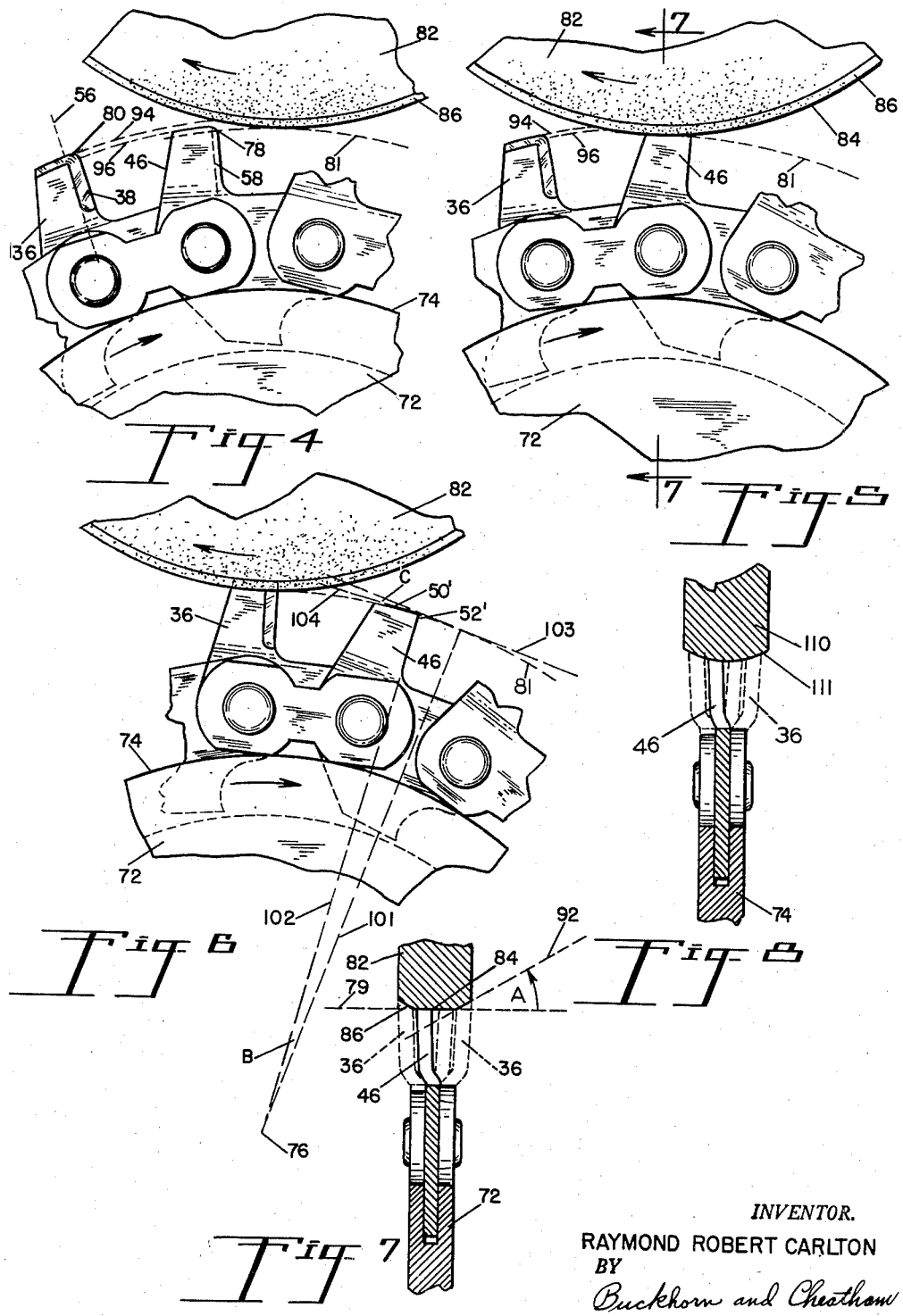

United States Patent Office 2,832,180
Patented Apr. 29, 1958

2,832,180

METHOD OF SHARPENING SAW CHAIN TEETH

Raymond R. Carlton, Portland, Oreg., assignor to Omark Industries, Inc., a corporation of Oregon Application February 10, 1955, Serial No. 487,346

3 Claims. (Cl. 51—281)

The present invention relates to saw chains for power chain saws, and more particularly to a new and improved method of sharpening saw chains and to an improved saw chain particularly adapted for sharpening in accordance with the invention.

One of the various types of saw chains used with power chain saws known as the "scratcher chain" is characterized by opposite cutting teeth which slit or cut their way through the work on the opposite sides of the kerf or raker teeth spaced to engage the kerf between the cuts of the cutter teeth and to rake or scratch out the material therebetween. Such chains have certain advantages including, in most instances, relative ease and low cost of manufacture. However, their utility has heretofore been limited because of the difficulties experienced in sharpening such chains. Sharpening each tooth by hand filing requires considerable time because of the numerous teeth in the chain and the care that must be exercised to sharpen each tooth so that it has the proper height relation to each of the other teeth in the chain and so that the various faces of teeth have their proper disposition.

It is a principal object of the present invention to provide a new and improved scratcher-type saw chain and method for sharpening the same.

More specifically, it is an object of the invention to provide a method of sharpening scratcher-type saw chains which requires a minimum amount of time and unskilled labor to perform the same.

Another object of the invention is to provide a method for sharpening saw chains which automatically assures that each tooth of the chain is of proper height with relation to the other teeth of the chain.

A further object is to provide a method which permits the use of power driven equipment to sharpen scratcher-type saw chains in a matter of seconds.

Still another object is to provide a method of sharpening a saw chain which is applicable to teeth having a surface hardness not permissible heretofore.

A still further and important object of the invention is to provide a new and improved scratcher-type saw chain which is particularly adapted for machine sharpening in accordance with the method of the invention.

A further object is to provide a new and improved scratcher saw chain tooth having a surface hardness greater than was permissible heretofore, and one which will have a longer cutting life and need be resharpened at less frequent intervals.

Other objects and advantages of the invention will become more apparent hereinafter.

In brief, in accordance with the present invention, the teeth of a scratcher-type saw chain are so designed that they may be sharpened or redressed by grinding away material from the top face thereof. The details of the method and the new and improved saw chain of the invention will be made apparent in the following specification taken in conjunction with the accompanying drawings, wherein:

Fig. 1 is a side elevation of a saw chain made in accordance with the invention;

Fig. 2 is a top view of the chain of Fig. 1;

Fig. 3 is a sectional view taken substantially along line 3—3 of Fig. 1;

Fig. 4 is an enlarged fragmentary view illustrating the method of sharpening a saw chain in accordance with the invention;

Fig. 5 is a further view showing the method of sharpening;

Fig. 6 is another view illustrating the method of sharpening;

Fig. 7 is a sectional view taken substantially along line 7—7 of Fig. 5;

Fig. 8 is a view illustrating a modified arrangement for and method of sharpening saw chains in accordance with the invention;

Fig. 9 is a view illustrating another arrangement for and method of sharpening saw chains in accordance with the invention;

Fig. 10 is a side view of saw chain sharpened by the arrangement and method shown in Fig. 9;

Fig. 11 is a sectional view taken along line 11—11 of Fig. 1; and

Fig. 12 is a sectional view taken along line 12—12 of Fig. 1.

With particular reference first to Figs. 1, 2 and 3, a scratcher-type of saw chain of the invention is shown comprising a plurality of longitudinally spaced apart center links 20 and opposite side cutter links 22 and tie straps 24, connected by means of conventional pivot pins 26 into a continuous chain. Each of the center links 20 is provided with a root portion 28 adapted to ride in the slot or groove 30 formed in the periphery of the chain saw guide member or saw bar 32 shown in fragmentary section in Fig. 3. The roots 28 are also adapted for engagement by the teeth of the driving sprocket of the chain saw motor, as is well known.

The side cutter links 22, which are alternate right and left configuration but otherwise identical, each comprises an elongate base portion having openings adjacent the leading and trailing ends thereof for receiving the pivot pins 26. Extending upwardly from the base portion of each link 22 is a tooth portion 36 which is offset laterally from the base portion away from the longitudinal median plane of the chain, as shown most clearly in Fig. 3. The tooth portions 36 are also positioned wholly rearwardly of the longitudinal center of the links. The front face 38 of each of the cutter portions 36 is substantially planar and bevelled with respect to the outer side surface of the tooth as to define a leading edge 40 on the outer side of the tooth. The offset of the tooth portions 36 is such that the leading edges 40 are positioned laterally outwardly of the plane of the corresponding side of the saw bar, and all other portions of the chain, as may be seen in Fig. 3, and the tooth portions 36 are slightly divergent in the upward direction so that the lower portions of the edges 40 will not catch or dig into the side walls of the kerf. It might be mentioned that, for convenience of description in the specification and in the claims, the positions of the various portions of the saw chain links will be referred to with regard to the relative position of the chain as it appears in Fig. 3, recognizing, however, that a saw chain may be operated in any position.

The side cutter teeth 36 are each formed with a top face 42 that is beveled downwardly and inwardly of the tooth from the outer edge 44 thereof, and recedes downwardly in a curve from the leading edge thereof which is formed by the intersection of the top face with the front face 38 and defines a forward cutting edge 45. As is evident in Fig. 2, the tooth portions 36 are arranged to toe laterally outwardly of the median plane of the chain so that the trailing part thereof will ride clear of the kerf side walls.

The center links 20 are each formed with an upwardly extending raker tooth portion 46; and, as best seen in Figs. 2 and 3, the raker tooth portions 46 are bent successively slightly to the right or left of the center line of the chain but to a lesser extent than the side cutter tooth portions 36 whereby the cutter tooth portions 36 are disposed wholly laterally outwardly of the raker tooth portions 46. The raker tooth portions 46 are each provided with a front face 48 spaced wholly rearwardly of the midpoint of the link. The top face 50 of each of the raker teeth is also rearwardly and downwardly curved for reasons as will be explained, from the intersection of the top face and front face 48, and which intersection defines a sharp cutting or raker edge indicated at 52. As shown in Fig. 3, the raker edges 52 preferably are disposed wholly beneath the cutting edges 45 of the side cutter teeth portions 36.

The theory of operation of a scratcher-type saw chain such as shown in Figs. 1, 2 and 3 is that the side cutters 36 form spaced apart slices through the workpiece and that the following raker teeth rake or scratch out the material between the slices. In practice, the teeth of a scratcher chain become worn and dull by reason of the wear and consequent regression on the upper leading corners of the teeth. Fig. 4 shows in a general way the appearance of worn cutter and raker teeth.

To sharpen a side cutter tooth 36, it has been the practice heretofore to file back the front face 38 thereof to a new position indicated by the line 56 in Fig. 4 and which position is rearwardly of the worn front edge whereby a new and sharp cutting edge 45 is formed on the tooth. In the case of the raker teeth, as they become worn they are filed back on their front face 38 to a position rearwardly of the regressed portion and indicated by the dotted line 58. This method of sharpening has many disadvantages. First of all, it must be done by hand and is, therefore, a laborious task in view of the many teeth in the chain and of the proximity to one another which hampers the manipulation of the file to sharpen the teeth. Also, the various angles of disposition of the tooth faces require the filer to pay close attention to what he is doing so that he does not file the tooth at the wrong angle, and it requires much practice to become proficient in filing. It is important in the scratcher-type chain that each of the cutting teeth be at exactly the same height and that the raker teeth be maintained at the correct level below the tops of the cutting teeth. However, in actual practice the cutting teeth 36 of the chain become dull at a much faster rate than the raker teeth 46 and, as a consequence, it ordinarily is not necessary to file back the raker teeth as far as the cutting teeth in order to form new sharp edges on the raker teeth. Accordingly, it has been the inclination, at least, of persons sharpening the chains to file back a raker tooth 46 only as far as is necessary to form a new sharp edge thereon and which is ordinarily not far enough to lower the front edge 52 of the tooth the same distance as the front edges 45 of the cutting teeth are lowered by reason of the simultaneous sharpening thereof. This causes the chain to operate much less efficiently. Also, since there are so many teeth on the chain, and since the job is so laborious, it has been found that many operators simply refuse to stop and sharpen the chain at the time when they should so as to maintain it at its peak efficiency, but instead they continue to operate the chain at continually decreasing efficiency for extended periods of time and which, of course, causes the resharpening to be all the more difficult because of the greater amount of material that must be filed away. It is obvious, of course, that since the teeth of prior scratcher chains must be filed to sharpen the same, the permissible hardness of the teeth is limited.

In accordance with the method of the present invention, scratcher-type saw chain teeth are sharpened, not by filing back on the front face of the tooth but, instead, by removing material from the top face of the tooth. This results in numerous advantages which will become apparent and are discussed hereinafter. An immediate advantage is obvious, and that is that the top or end faces of the teeth are exposed and accessible to sharpening by grinding, hence permitting the use of mechanical equipment eliminating the slow and tedious hand labor involved in sharpening by the method used heretofore. From grinding follows a second advantage, in that the saw chain teeth may be made of harder material or, as will be shown and described hereinafter, may be formed with hard surface layers that could not be used if the chain were to be hand filed when it is sharpened.

In accordance with a preferred embodiment of the invention, the top faces of the teeth of a saw chain are ground by moving the chain longitudinally in an arcuate path so that the pivotal connections of a tooth follow the same path and causing a coplanar grinding wheel to engage the top faces as they move through the curved path. This is most conveniently done by mounting the saw chain to be sharpened upon a suitable guide member providing a curvilinear path over a portion of the chain run. Such a guide member may be, for example, a conventional chain saw sawbar having a rounded nose. A grinding wheel may be mounted adjacent the curved portion of the guide member in position to engage the top faces of the saw chain as the chain is moved around the curved portion. An example of suitable apparatus is shown in my copending application Serial No. 512,154 filed May 31, 1955. Figs. 4 to 7, inclusive, are fragmentary views illustrating the sharpening of a saw chain in accordance with the method of the invention. In those views the guide member which may be a saw bar is indicated at 72 and is shown as having a curved saw chain supporting surface 74 conforming to a circular arc about an axis indicated at 76 in Fig. 6. The fragmentary length of chain shown includes a raker tooth 46 having a regressed or worn raker edge, as indicated at 78 in Fig. 4, and a cutter tooth 36 having a regressed or worn forward cutting edge as indicated at 80 in Fig. 4.

A fragment of a grinding wheel is shown at 82, the grinding wheel being mounted with its axis (not shown) parallel to the guide member axis 76. With particular reference to Fig. 7, the grinding wheel 82 is formed with a flat, axially parallel, central peripheral portion 84 adapted to engage the raker tooth top faces 50 and with opposite, bevelled, peripheral edge portions 86 adapted to engage the top faces 42 of the opposite cutter teeth. The edge portions 86 are sloped or bevelled as shown so as to form the desired angle A of inward bevel on the cutter top faces 42.

Considering first the sharpening of the raker tooth 46 as shown in Figs. 4 to 7, inclusive, the grinding wheel 82 is positioned with its central face 84 tangential to the path 81 of the new surface it is desired to form on the tooth. The chain and tooth 46 is then moved about the guide member while the grinding wheel 82 is simultaneously driven about its axis. As the tooth 46 is moved into contact with the grinding wheel 82, as shown in Fig. 5, the wheel will abrade or grind away the upper portion of the tooth to form a new top surface 50' (Fig. 6) thereon coinciding to the line 81 and a new resharpened raker edge 52'. It will be observed that the grinding wheel presents a working surface contacting the tooth 46 along the line 79 which lies in a radial plane of the axis 76 and is parallel to the surface 50' it is desired to form on the tooth. It will be further observed that the ground top face 50' of a raker link corresponds to the path of line revolved about the axis 76. The drawings show the sharpening operation as being effected in one pass of the tooth 46 across the grinding wheel 82. It will be realized that as a practical matter the sharpening will in most instances be accomplished by several passes each grinding small increments from the top surface of the tooth, but the end result will be as depicted.

A cutter tooth 36 as shown in Fig. 4 will be dressed or sharpened by engagement with the grinding wheel side edge 86 in a manner substantially similar to the sharpening of the raker teeth 46. The wheel edge 86 will present a working surface having effective engagement with the tooth 46 along a line 92 (Fig. 7) lying in a radial plane of the axis 76, with the result that the new top face 42 of the tooth will be the path of a line revolved about the axis 76 of the guide member. The path of curvature of the original outer top edge of the cutter tooth is indicated at 94 in Fig. 4, while the path of the corresponding edge of the resharpened tooth is indicated at 96.

Referring to Fig. 1, with the preferred configuration of the grinding wheel as above described, in the sharpened chain the outer terminus of a raker tooth cutting edge 52 will be spaced a distance $a$ from a line 93 joining the centers of the pivotal connection of its center link to adjoining side links; and the outer terminus of a cutter tooth cutting edge 45 will be spaced a distance $b$ from a line 95 joining the centers of the pivotal connections of its side link to the adjoining center links, the distance $b$ being greater than the distance $a$.

It is absolutely necessary that the front or cutting face of the raker teeth 46 and cutting teeth 36 be spaced rearwardly of the midpoint between the pivotal connections of the link if a chain is to be sharpened in accordance with the method just described. The reason for this is so that the top faces of the sharpened teeth will recede downwardly from the forward cutting edge. If the front face were forward of the midpoint of the tooth, the top face of the sharpened tooth would slope upwardly from the forward cutting edge so that the forward edge would not be the highest point of the tooth and, consequently, would not be in position to engage the bottom of a kerf as is necessary for any cutting action to occur.

Preferably, the front faces of the teeth slant rearwardly of the teeth by a slight amount from bottom to top thereof as shown in the drawings. The line 101 in Fig. 6 is perpendicular to a line (not shown) through the axes of the pivotal connections of the raker tooth 46 at the midpoint of such latter line. It will, as a consequence, intersect the axis 76. The line 102 which lies in the plane of the front face 48 of the tooth 46 defines with the line 101 the desired angle of inclination B of the front face and which angle is preferably about 5 degrees. Preferably, the front face 38 of a raker tooth 46 is formed so that the line 102 will intersect the axis 76 of the guide member on which the chain is to be sharpened as shown. In this event, the clearance angle indicated at C in Fig. 6 will be the same for all stages of sharpening of the tooth and will be equal to the angle B. The clearance angle C is defined as the included angle lying between a first line indicated at 103 extending through the cutting edge 52 of the tooth and perpendicular to the line 101, and a second line 104 also extending through the cutting edge 52 of the tooth and tangent to the top face 50. The front face 38 of a cutter tooth is similarly inclined rearwardly of the tooth so that the front edge 40 thereof will be inclined rearwardly at an angle corresponding to the angle B.

An important advantage derived from sharpening a chain in accordance with the method of the invention is that the cutting portions of the links may be made relatively shorter than heretofore since they have previously been of substantial length to make possible repeated resharpening by filing back the front face. By making the tooth portion shorter, there will be provided a greater clearance space intermediate the cutter portions of the successive links for carrying wood chips out of the kerf. Such clearance space is very important inasmuch as the efficiency of a saw chain depends in a great part upon whether or not there is adequate clearance between the teeth for the chips severed by the teeth to be carried out of the kerf. If desired, the teeth of a chain to be sharpened in accordance with the method of the invention may be formed with relatively higher tooth portions so as to enable additional sharpening of the chain.

As will be evident, a corresponding amount will be removed from the cutter links and the raker links when a chain is sharpened as described above and, accordingly, the correct relation between the cutter links and raker links will automatically be attained upon sharpening of the chain. As intimated before and as will be evident, this result can be obtained by using semiautomatic equipment such as that shown and described in my co-pending application Serial No. 512,154, filed May 31, 1955, and which can be operated by relatively unskilled persons.

While Fig. 7 illustrates a preferred configuration of the profile of the grinding wheel and which configuration will result in sharpening of the teeth so as to obtain the preferred relation therebetween, it is to be understood that grinding wheels having other surface profiles may be used. For example, in Fig. 8 there is shown a grinding wheel 110 having in section a symmetrically curved periphery 111 and which curve may, in fact, occur on a wheel such as shown in Fig. 7 if it is not dressed at sufficient intervals.

Also, it is possible to sharpen a chain by passing the chain into contact with a grinding wheel 114 having a perfectly cylindrical periphery such as shown in Fig. 9. If a saw chain having raker teeth 115 and cutter teeth 116 spaced substantially equidistantly rearwardly of the midpoint of the corresponding link is sharpened using such a wheel, the front edges of the teeth 115, 116 will all be of substantially the same height as shown in Fig. 10. It has been found that such a chain will operate but with less efficiency than a chain made and sharpened in accordance with the preferred embodiment described above, and wherein the raker teeth 46 are of lesser height than the cutter teeth 36. It should be noted, however, that the height of the raker teeth 115 and cutter teeth 116 will not be the same if the teeth are not spaced equidistantly from the midpoint of the corresponding link. For example, if the front face of the raker links 115 correspond to the dotted lines 117, the front edges of the sharpened raker teeth would be lower than the front edges of the cutter teeth 116, as may be seen in Fig. 10. Similar control over the relative height of the raker and cutter links of a chain sharpened on a wheel dressed as shown in Fig. 7 or Fig. 8 may be obtained. For example, in the chain illustrated in Figs. 1 to 7, inclusive, the raker teeth 46 and cutter teeth 36 are spaced relatively equidistantly rearwardly of the midpoint of the corresponding links whereby the raker teeth front edges 52 are substantially the same height as the lower corner of the cutter tooth front edges 45. However, if the raker teeth were spaced relatively less distantly from the midpoint of the links as compared with the cutter teeth, the forward edges of the raker teeth would be relatively higher. Conversely, if the raker teeth were spaced a greater distance rearwardly of the links as compared with the cutter teeth, then the raker links would be even lower relative to the cutter teeth.

As intimated heretofore, one of the advantages afforded by sharpening a tooth by grinding rather than filling is that it is practical to use materials of greater hardness to form the teeth which, of course, results in prolonging the cutting life of the teeth. It also becomes practical to provide teeth with hard surface coating to extend the life of the teeth even longer. For example, with reference to Figs. 11 and 12, a cutter tooth 36 may be provided with a coating 120 of wolfram carbide or similar relatively hard surfacing material on its outer side surface and on the front face 38 thereof. It was not practical to do this heretofore for the reason that it would be virtually impossible to file back the hard surface on the face 38. Also, as will be obvious, if the front face were filed back, the hard surface coating would have been removed and the advantage lost. Such coatings do not, however, interfere with the sharpening of the tooth by the method of the invention. First of all, the grinding is not retarded by reason of the hardness of the coating materials and, also, since the sharpening is done by removing material from the top face of the tooth, the coating on the front face beneath the worn or dull edge is not removed and, after sharpening, the tooth is restored to the same efficiency it had when it was new.

Having illustrated and described preferred embodiments of the invention, it should be apparent to those skilled in the art that the invention permits of modification in arrangement and detail. I claim as my invention all such modifications as come within the true spirit and scope of the appended claims.

I claim:

1. The method of sharpening the teeth of a scratcher saw chain having side cutter teeth each extending upwardly from a side cutter chain link and raker teeth each extending upwardly from a center raker cutter chain link, the side chain links each having pivotal connections at their ends with the ends of the center chain links, said side cutter teeth having side cutting edges extending upwardly along their laterally outer leading side edges and said raker teeth having raker cutting edges extending laterally along their upper leading edges, the cutting edges of the teeth of each of said links being spaced rearwardly of the midpoint between the pivotal connections of its link, said method comprising continuously moving said chain and the grinding surface of a grinding member relative to each other along an arcuate path extending longitudinally of the chain with the leading side edges of said teeth extending outwardly from the axis of said path, contacting the ends of said teeth with said grinding surface to grind material from the ends of said teeth along surfaces having arcuate elements concentric with said axis and intersecting said cutting edges, and controlling the contact between said grinding surface and said teeth to space the outer terminus of each side cutting edge a distance from a line joining the centers of the pivotal connections of its side link greater than the distance of each raker cutting edge from a line joining the centers of the pivotal connection of its center link.

2. The method of sharpening the teeth of a scratcher saw chain having side cutter teeth each extending upwardly from a side cutter chain link and raker teeth each extending upwardly from a center raker cutter chain link, the side chain links each having pivotal connections at their ends with the ends of the center chain links, said side cutter teeth having beveled leading faces thereon providing side cutting edges extending upwardly along their laterally outer leading side edges and front cutting edges extending laterally along their upper leading edges and said raker teeth having raker cutting edges extending laterally along their upper leading edges, the cutting edges of the teeth each of said links being spaced rearwardly of the midpoint between the pivotal connections of its link, said method comprising continuously moving said chain longitudinally of itself in an arcuate path with the leading side edges of said teeth extending outwardly from the axis of said path, contacting the ends of said teeth with the rotating surface of a grinding wheel having its axis parallel to the axis of said path to grind material from the ends of said teeth along surfaces having arcuate elements concentric with the axis of said path and intersecting said side cutting edges, and shaping the grinding surface of said grinding wheel to space the outer terminus of each side cutting edge a distance from a line joining the centers of the pivotal connection of its side link greater than the distance of each raker cutting edge from a line joining the centers of the pivotal connections of its center link.

3. The method of sharpening the teeth of a scratcher saw chain having side cutter teeth each extending upwardly from a side cutter chain link and raker teeth each extending upwardly from a center raker cutter chain link, the center chain links having pivotal connections between their ends and the ends of the side chain links, said side cutter teeth having beveled front faces providing side cutting edges extending upwardly along their laterally outer leading side edges and front cutting edges extending laterally along their upper leading edges and said raker teeth having raker cutting edges extending laterally along their upper leading edges, the cutting edges of the teeth of each of said links being spaced rearwardly of the midpoint between the pivotal connections of its link, said method comprising continuously moving said chain longitudinally of itself along an arcuate path with the leading side edges of said teeth positioned in radial planes through the axes of said path, contacting the ends of said teeth with the rotating grinding surface of a grinding wheel having its axis parallel to the axis of said path to grind material from the ends of said teeth along surfaces having arcuate elements concentric with the axis of said path and intersecting said cutting edges and maintaining the raker cutting edge of each of said raker teeth rearwardly of its central link with respect to the position of the side cutting edge on each of said side cutter links so as to space the outer terminus of each said side cutting edge a distance from a line joining the centers of the pivotal connections of its side link greater than the distance of each said raker cutting edge from a line joining the center of the pivotal connections of its center link.

References Cited in the file of this patent

UNITED STATES PATENTS

| | | |
|---|---|---|
| 1,277,375 | Butters | Sept. 3, 1918 |
| 2,112,679 | Rickenmann | Mar. 29, 1938 |
| 2,217,145 | Stihl | Oct. 8, 1940 |
| 2,351,112 | Day | June 13, 1944 |
| 2,356,437 | Smith | Aug. 22, 1944 |
| 2,446,774 | Mall | Aug. 10, 1948 |
| 2,485,962 | Entwisle | Oct. 25, 1949 |
| 2,522,799 | Pitcher | Sept. 19, 1950 |
| 2,533,648 | Warburg | Dec. 12, 1950 |
| 2,651,336 | Warren | Sept. 8, 1953 |
| 2,699,691 | Grupp | Jan. 8, 1955 |
| 2,716,908 | Lindberg | Sept. 6, 1955 |
| 2,729,987 | Bluemink | Jan. 10, 1956 |

FOREIGN PATENTS

| | | |
|---|---|---|
| 564,152 | Great Britain | Sept. 14, 1944 |
| 581,061 | Germany | July 20, 1933 |